(12) United States Patent
Worledge

(10) Patent No.: US 7,009,414 B2
(45) Date of Patent: Mar. 7, 2006

(54) ATOMIC FORCE MICROSCOPE AND METHOD FOR DETERMINING PROPERTIES OF A SAMPLE SURFACE USING AN ATOMIC FORCE MICROSCOPE

(75) Inventor: Daniel Worledge, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 10/688,630

(22) Filed: Oct. 17, 2003

(65) Prior Publication Data

US 2005/0081609 A1   Apr. 21, 2005

(51) Int. Cl.
*G01R 22/00*   (2006.01)
(52) U.S. Cl. .................................................. 324/757
(58) Field of Classification Search .................. 73/105; 324/754–762, 537
See application file for complete search history.

(56) References Cited

U.S. PATENT DOCUMENTS

| 5,925,818 | A | * | 7/1999 | Cleveland et al. ............. 73/105 |
| 5,929,643 | A | * | 7/1999 | Sakai et al. .................. 324/750 |
| 6,552,554 | B1 | * | 4/2003 | Prinz et al. .................. 324/719 |

* cited by examiner

*Primary Examiner*—Robert Raevis

(74) *Attorney, Agent, or Firm*—F. Chau & Associates, LLC

(57) ABSTRACT

A method for determining properties of a sample surface using an atomic force microscope includes applying a first voltage between the sample and a probe, moving the probe towards the surface of the sample, and stopping movement of the probe towards the surface of the sample when current in the probe is initially detected. An oscillating magnetic field is applied to the probe such that the probe obtains stable contact with the surface of the sample.

17 Claims, 1 Drawing Sheet

ATOMIC FORCE MICROSCOPE AND METHOD FOR DETERMINING PROPERTIES OF A SAMPLE SURFACE USING AN ATOMIC FORCE MICROSCOPE

GOVERNMENT FUNDING

Funding for this invention was provided by the U.S. Government under DARPA contract number MDA972-99-C-0009

BACKGROUND OF THE INVENTION

1. Field of the Invention

The present invention relates to conductive probe microscopes, and more particularly to atomic force microscopes.

2. Description of the Related Art

Scanning probe microscopy, such as conductive atomic force microscopy (CAFM), is widely used for observing and analyzing sample surfaces in the atomic scale. One conventional example of an atomic force microscope (AFM) uses a probe that has a microfabricated tip mounted on a flexible cantilever. The tip is typically made from $Si_3N_4$ or Si. The tip is slowly scanned across the surface of a material, just a few angstroms away from the surface (non-contact mode) or in contact with it (contact mode). The force between the atoms on the surface of the material and those on the tip cause the tip to deflect. The magnitude of the deflection depends on the separation between the surface atoms and the tip atoms and on the atomic forces between them, such as van der Waals forces or Pauli exclusion forces. This deflection can be recorded in various ways, the most common of which uses a laser focused on the top of the cantilever and reflected onto photodetectors. The photodetector signals are used to map the surface topography of samples with resolutions down to the atomic and nano scales. The lateral and vertical movements of the tip or sample are controlled by piezoelectric transducers and a feedback loop that produce voltage differences proportional to the movement.

After mapping a microscopic feature of interest, such as a sub-micron magnetic tunnel junction, the conductive tip can be used to make an electrical measurement of the feature. The tip is centered over the feature and then the x-y scanning is stopped. The tip is then lowered into contact with the feature. After contact is made, current can be passed through the feature to make an electrical measurement.

During the process of lowering the tip into contact with the feature, the tip usually must be pushed onto the sample surface progressively harder until electrical contact is made. This causes the tip to wear out rapidly, usually after only a few contacts. Further, the downward force on the tip required to maintain electrical contact between the tip and the sample surface can damage the sample.

SUMMARY OF THE INVENTION

An object of the present invention is to provide an atomic force microscope and method for determining properties of a sample surface using an atomic force microscope that reduces tip wear.

Another object of the present invention is to provide an atomic force microscope and method for determining properties of a sample surface using an atomic force microscope that eliminates or reduces damage to the sample surface.

A method for determining properties of a sample surface using an atomic force microscope according to an exemplary embodiment of the invention includes applying a first voltage between the sample and a probe, moving the probe towards the surface of the sample, and stopping movement of the probe towards the surface of the sample when current in the probe is initially detected. A magnetic field is applied to the probe such that the probe obtains stable contact with the surface of the sample.

A method according to at least one embodiment of the invention includes oscillating the magnetic field applied to the probe.

An atomic force microscope that determines characteristics of a surface of a specimen according to an exemplary embodiment of the invention includes means for applying a first voltage between the sample and the probe, means for moving the probe towards the surface of the sample, means for stopping movement of the probe towards the surface of the sample when current in the probe is initially detected, and means for applying a magnetic field to the probe such that the probe obtains stable contact with the surface of the sample.

An atomic force microscope according to at least one embodiment of the invention includes a means for oscillating the magnetic field applied by the means for applying a magnetic field.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DESCRIPTION OF PREFERRED EMBODIMENTS

Figure 1:
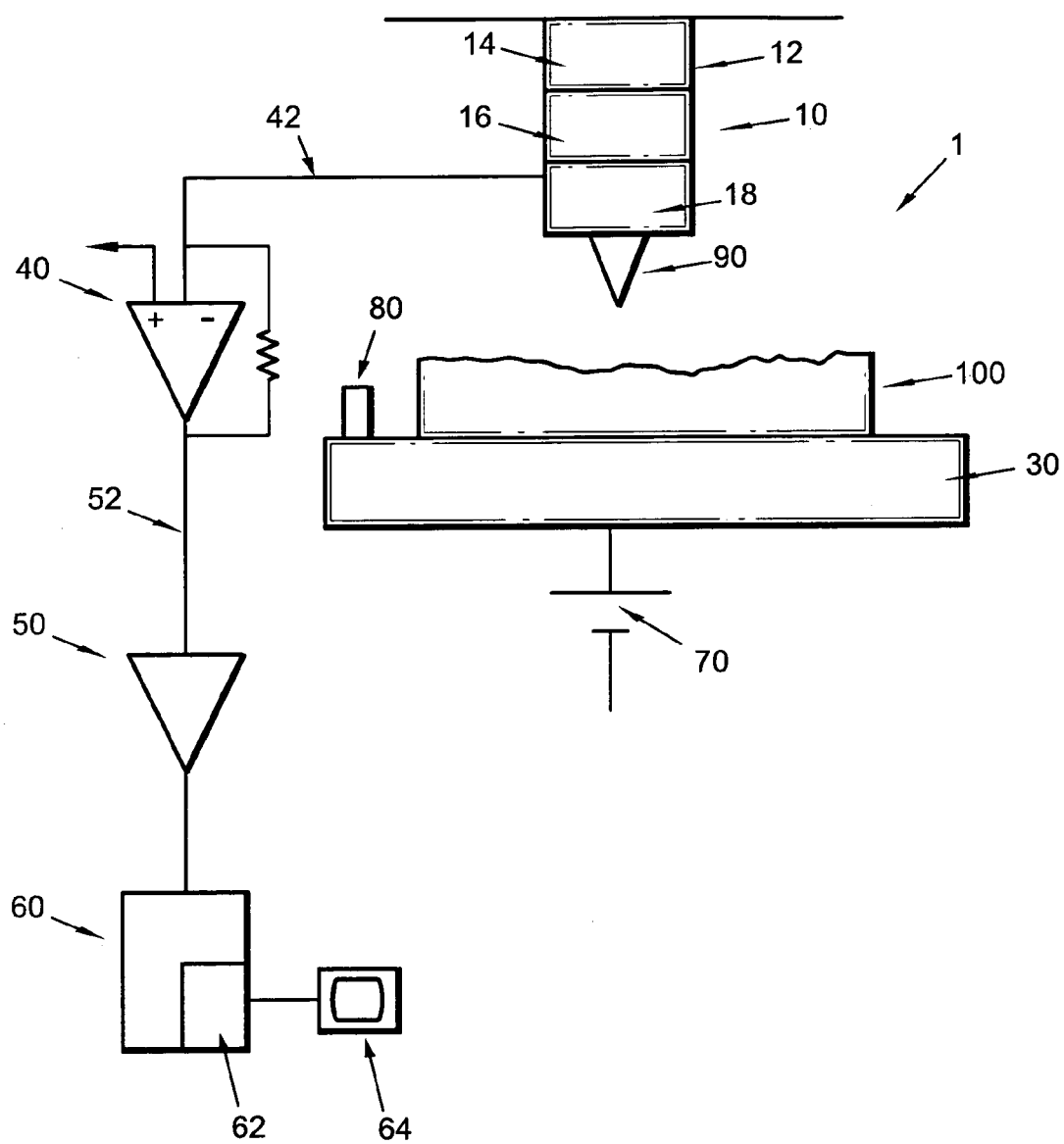
FIG. 1 shows an atomic force microscope according to an exemplary embodiment of the invention.

In the method of performing atomic force microscopy according to various exemplary embodiments of the invention, a probe is lowered in contact with the surface of a sample until current begins to flow between the probe and the sample. A magnetic field is then applied to the probe and sample. The magnetic field is oscillated rapidly, causing the AFM probe to move such that the probe makes excellent stable contact with the surface of the sample. Probe wear is reduced because the probe does not need to be forcefully pushed onto the surface to initiate and maintain electrical contact.

FIG. 1 shows an atomic force microscope according to an exemplary embodiment of the invention. The atomic force microscope 1 includes a piezoelectric scanner 10, a stage 30, a current-to-voltage converter 40, an amplifier 50, a controller 60, a voltage source 70 and a magnetic field source 80. The piezoelectric scanner 10 includes a piezoelectric tube 12. The piezoelectric tube 12 includes an X-piezo element 14, a Y-piezo element 16 and a Z-piezo element 18, which move the probe in the X, Y and Z directions, respectively. According to the present embodiment, a probe 90 is attached to the bottom of the piezoelectric tube 12. However, it should be appreciated that, in other exemplary embodiments of the invention, the piezoelectric tube 12 can be attached to the stage 30. The probe 90 is formed from any suitable material, such as, for example, silicon nitride.

During a specimen measurement, a sample 100 is placed on the stage 30. The sample 100 can be, for example, a semiconductor device including sub micron circuit features. The voltage source 70 applies a known voltage to the sample 100. The controller 60 then actuates the piezo-electric scanner 10 to lower the probe 90 in the z-direction onto the sample 100 until current in the probe 90 is detected by the controller 60. It should be appreciated that, in other embodiments in which the piezoelectric tube 12 is attached to the stage 30, the probe 90 is held stationary in the z-direction and the stage 30 is raised until electrical contact between the sample 100 and the probe 90 is initiated.

Once current begins to flow through the probe 90, movement of the probe 90 (or stage 30) in the z-direction is stopped, and the controller activates the magnetic field source 80. The magnetic field source 80 can be any suitable magnetic field source, such as, for example, a magnetic coil. The magnetic field source 80 applies an oscillating magnetic field to the probe 90, causing the probe 90 to move in such a way that the probe 90 makes excellent stable contact with the sample 100. The magnetic field can be oscillated with an amplitude of, for example, 200 Oe and a frequency of, for example, 5 Hz for a duration of, for example, 2 cycles.

The current induced in the probe 90 by the voltage source 70 is fed along line 42 to current-to-voltage converter 40. A voltage output passes along line 52 from current-to-voltage converter 40 to amplifier 50. The amplifier 50 amplifies the voltage output, which is then input to the controller 60. The controller 60 can be any suitable controller, such as a user-accessible computer 62 including a monitor 64. The voltage outputs collected by the computer can be used to display various imaging maps of the surface topography of the sample 100 on the monitor 64. For example, simultaneous mapping of topography and local current signal can be achieved, and regions of higher and lower conductivity can be differentiated to correlate with topography It should be appreciated that, in other embodiments, the atomic force microscope according to the invention can have any other suitable configuration that includes a magnetic field generator that applies a magnetic field to the probe. For example, the probe can be disposed at an end of a piezo-electric cantilever beam. Further, according to at least one embodiment, the atomic force microscope according to the invention includes a laser beam and photodetectors to record the movement of the probe as the probe is scanned across the sample surface.

Although the illustrative embodiments have been described herein with reference to the accompanying drawings, it is to be understood that the present invention and method are not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A method for determining properties of a sample surface using an atomic force microscope, comprising:
   applying a first voltage between the sample and a probe;
   moving the probe towards the surface of the sample;
   stopping movement of the probe towards the surface of the sample when current in the probe is initially detected; and
   applying a magnetic field to the probe such that the probe obtains stable contact with the surface of the sample.

2. The method of claim 1, wherein the magnetic field is applied by a magnetic coil.

3. The method of claim 1, wherein the probe is moved towards the sample by a piezoelectric scanner.

4. The method of claim 1, further comprising:
   converting the current in the probe to a second voltage.

5. The method of claim 4, further comprising:
   amplifying the second voltage; and
   generating an image representative of a sample surface property based on the amplified second voltage.

6. The method of claim 1, wherein the magnetic field is applied to the probe after the movement of the probe towards the sample surface is stopped.

7. The method of claim 1, further comprising:
   oscillating the magnetic field applied to the probe.

8. The method of claim 7, wherein the probe is oscillated with an amplitude of 200 Oe and a frequency of 5 Hz for a duration of 2 cycles.

9. An atomic force microscope that determines characteristics of a surface of a specimen, comprising:
   means for applying a first voltage between a sample and a probe;
   means for moving the probe towards the surface of the sample;
   means for stopping movement of the probe towards the surface of the sample when current in the probe is initially detected; and
   means for applying a magnetic field to the probe such that the probe obtains stable contact with the surface of the sample.

10. The atomic force microscope of claim 9, wherein the means for applying a magnetic field is a magnetic coil.

11. The atomic force microscope of claim 9, wherein the means for moving the probe towards the sample is a piezo-electric scanner.

12. The atomic force microscope of claim 9, further comprising:
   means for converting the current in the probe to a second voltage.

13. The atomic force microscope of claim 12, further comprising:
   means for amplifying the second voltage; and
   means for generating an image representative of a sample surface property based on the amplified second voltage.

14. The atomic force microscope of claim 9, wherein the means for applying a magnetic field applies a magnetic field to the probe after the means for stopping movement of the probe stops movement of the probe towards the sample surface.

15. The atomic force microscope of claim 9, further comprising:
   means for oscillating the magnetic field applied to the probe.

16. The atomic force microscope of claim 15, wherein the means for oscillating the probe oscillates the probe with an amplitude of 200 Oe and a frequency of 5 Hz for a duration of 2 cycles.

17. The atomic force microscope of claim 9, further comprising a means for supporting the sample, the means for applying a magnetic field being disposed on the means for supporting the sample.

* * * * *